United States Patent
Lund

(10) Patent No.: US 11,178,332 B2
(45) Date of Patent: Nov. 16, 2021

(54) DIGITAL BORESIGHTING LASER RANGE FINDER TO IMAGING DEVICE

(71) Applicant: Sensors Unlimited, Inc., Princeton, NJ (US)

(72) Inventor: Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 95 days.

(21) Appl. No.: 15/863,111

(22) Filed: Jan. 5, 2018

(65) Prior Publication Data

US 2019/0215459 A1 Jul. 11, 2019

(51) Int. Cl.
| | |
|---|---|
| H04N 5/232 | (2006.01) |
| F41G 3/32 | (2006.01) |
| F41G 3/06 | (2006.01) |
| G06T 7/80 | (2017.01) |
| H04N 5/33 | (2006.01) |
| H04N 5/225 | (2006.01) |
| G06T 3/40 | (2006.01) |
| G01S 17/08 | (2006.01) |
| G01S 7/51 | (2006.01) |
| G01S 7/497 | (2006.01) |

(52) U.S. Cl.
CPC ........... *H04N 5/23293* (2013.01); *F41G 3/06* (2013.01); *F41G 3/326* (2013.01); *G01S 7/4972* (2013.01); *G01S 7/51* (2013.01); *G01S 17/08* (2013.01); *G06T 3/40* (2013.01); *G06T 7/80* (2017.01); *H04N 5/232* (2013.01); *H04N 5/23245* (2013.01); *H04N 5/33* (2013.01); *G06T 2207/10048* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 4,155,096 A * | 5/1979 | Thomas | F41G 3/145 244/3.13 |
| 6,434,449 B1 * | 8/2002 | De Smet | B25J 9/1692 318/568.1 |
| 9,323,061 B2 | 4/2016 | Edwards et al. | |
| 9,632,304 B2 | 4/2017 | Waterman et al. | |
| 9,778,104 B2 * | 10/2017 | Maryfield | H01L 31/03046 |
| 10,218,921 B2 | 2/2019 | Neal et al. | |
| 2004/0083035 A1 * | 4/2004 | Ellis | A61H 3/061 701/1 |
| 2012/0051383 A1 * | 3/2012 | Stern | H01S 5/423 372/50.21 |
| 2013/0128257 A1 * | 5/2013 | Stettner | G01S 17/06 356/4.01 |
| 2016/0054434 A1 * | 2/2016 | Williams | G01S 7/4865 356/5.01 |
| 2016/0157958 A1 * | 6/2016 | Courtin | G02B 7/005 433/27 |

(Continued)

*Primary Examiner* — Frederick D Bailey
(74) *Attorney, Agent, or Firm* — Locke Lord LLP; Joshua L. Jones; Scott D. Wofsy

(57) ABSTRACT

A method of digitally boresighting includes finding a laser spot in a field of view of an imaging device that has an optical center, wherein the laser spot is generated by a laser, determining an offset vector between the laser spot in the field of view and the optical center, and correcting for boresight misalignment of the laser and imaging device in the image on a display using the offset vector.

16 Claims, 2 Drawing Sheets

(56) References Cited

U.S. PATENT DOCUMENTS

| | | | |
|---|---|---|---|
| 2016/0307325 A1* | 10/2016 | Wang | G01B 11/22 |
| 2016/0309140 A1* | 10/2016 | Wang | H04N 5/3765 |
| 2017/0134710 A1* | 5/2017 | Wang | G06T 7/521 |
| 2017/0219693 A1* | 8/2017 | Choiniere | G01S 7/484 |
| 2018/0113216 A1* | 4/2018 | Kremer | G01S 17/42 |
| 2019/0204160 A1* | 7/2019 | Simolon | H04N 5/378 |
| 2019/0204445 A1* | 7/2019 | Ramsey | G01S 17/89 |

* cited by examiner

DIGITAL BORESIGHTING LASER RANGE FINDER TO IMAGING DEVICE

BACKGROUND OF THE INVENTION

1. Field of the Invention

The present disclosure relates to laser range finders, and more particularly to boresighting for laser range finders.

2. Description of Related Art

A traditional laser range finder is implemented with an output laser, a wide field of view receiver, and a fixed optic. A traditional laser range finder typically employs a camera or direct-view optic to target an object for range finding. The camera or viewer may have a reticle that denotes where the laser is supposed to be pointed. It is most commonly the case that the laser spot is generated by the range finding laser in a wavelength that is not visible to a human viewer or targeting camera, so the fixed optic must be boresighted to the output laser such that a cross-hair at the center of the optic is aligned with the laser spot created by the output laser independent of target distance. This requires manufacturing precision and also limits traditional systems to having a single magnification and field of view.

The conventional techniques have been considered satisfactory for their intended purpose. However, there is an ever present need for improved boresighting for laser range finders. This disclosure provides a solution for this need.

SUMMARY OF THE INVENTION

A laser range finder system includes a laser for illuminating a target with a laser spot in a predetermined wavelength. An imaging device is connected to the laser for viewing the target, wherein the imaging device has a field of view with an optical center and is sensitive in the predetermined wavelength. A display is operatively connected to the imaging device for displaying an image of the target. A controller operatively connects the imaging device to the display, wherein the controller includes machine readable instructions that cause the controller to perform any of the method disclosed herein.

The controller can be operatively connected to the imaging device and can include machine readable instructions that cause an imaging sensor of the imaging device to operate in a binary output first mode sensitive to short duration laser pulses for laser pulse detection, and to operate in a second mode for imaging scenic information for targeting context, wherein the imaging sensor operates with a higher dynamic range and lower frequency in the second mode than in the first mode. The machine readable instructions can cause the controller to find the laser spot using the first sensor in the first mode.

The laser can illuminate the target with a SWIR wavelength including 1550 nm, and the imaging device can includes a SWIR imaging sensor operatively connected to the controller for imaging the laser spot and determining the offset vector. The laser can include a pulse generator configured to illuminate the target with laser pulses, and the imaging device can include an imaging sensor operatively connected to the controller for validating the laser by laser pulse detection based on pulse duration and pulse repetition rate. The imaging device can include a first imaging sensor for imaging the laser spot in a first channel and a second imaging sensor for imaging the target in a second channel, wherein the first imaging sensor is sensitive to the predetermined wavelength, and wherein the second imaging sensor is not sensitive to the predetermined wavelength. The second imaging sensor can be optically coupled with an interchangeable optic.

A method of digitally boresighting includes finding a laser spot in a field of view of an imaging device that has an optical center, wherein the laser spot is generated by a laser, determining an offset vector between the laser spot in the field of view and the optical center, and correcting for boresight misalignment of the laser and imaging device in the image on a display using the offset vector.

Correcting for boresight misalignment can include offsetting the image displayed in the display. Offsetting the image displayed in the display can include at least one of cropping and/or scaling an image of the field of view of the imaging device to center the laser spot in the image displayed on the display. Correcting for boresight misalignment can include placing a cross-hair over the laser spot in the image displayed on the display. The laser spot need not be visible in the image displayed on the display.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
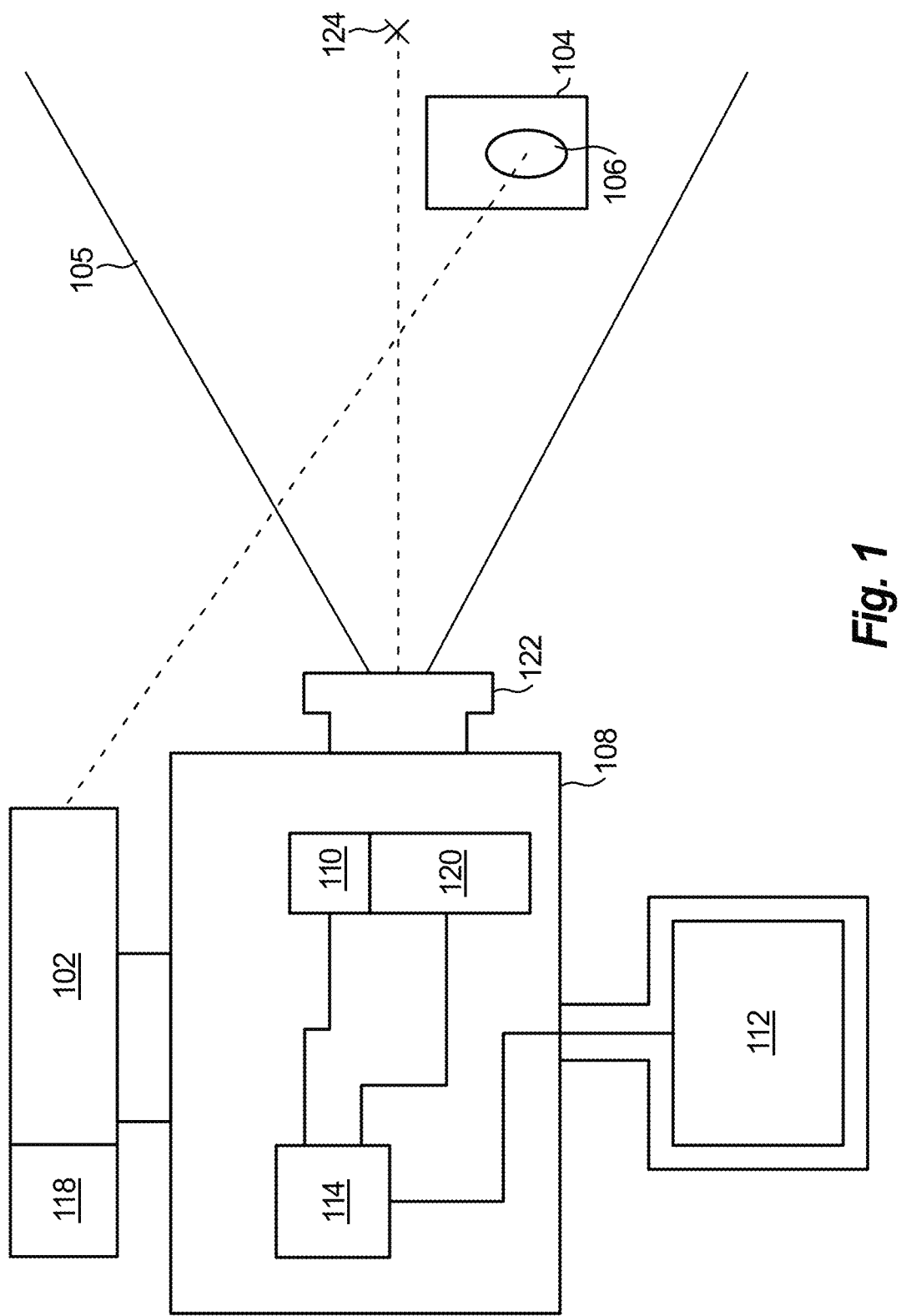
FIG. 1 is a schematic view of an exemplary embodiment of a system constructed in accordance with the present disclosure, showing the misalignment between the laser and the imaging device.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to digitally boresight a laser to an imaging system in a laser range finder.

A laser range finder system 100 includes a laser 102 for illuminating a target 104 with a laser spot 106 in a predetermined wavelength. An imaging device 108 is connected to the laser for viewing the target 104, e.g., the laser 102 and imaging device 108 are roughly aligned so that the laser spot 106 and target 104 are within the field of view 105 of the imaging device 108 even if they are not centered on the optical center 124 of the field of view 105. The imaging device 108 is sensitive in the predetermined wavelength, e.g., the laser 102 can be a SWIR laser illuminating the target 104 with the laser spot 106 using 1550 nm laser illumination, and the imaging device can include a SWIR imaging sensor 110 that is sensitive to SWIR illumination at 1550 nm. The controller 114 is operatively connected to the imaging sensor 110 and includes machine readable instructions that cause the imaging sensor 110 to operate in a relatively high frequency, binary output first mode sensitive to short duration laser pulses for laser pulse detection, and to operate in a relatively high dynamic rage, low frequency in a second mode for imaging the laser spot 106 with other scenic information for targeting context. The first mode performing binary pulse detection, is used for determining the offset vector as described below. The spatial/pixel resolution of both modes can be the same.

A display 112 is operatively connected to the imaging device 108 for displaying an image of the target 104. A controller 114 operatively connects the imaging device 108 to the display 112. The controller 114 includes machine readable instructions that cause the controller 114 to perform any of the methods disclosed herein, as describe below. The laser 102 can include a pulse generator 118 configured to illuminate the target 104 with laser pulses, e.g. so that the laser spot 106 pulses. The SWIR imaging sensor 110 can be operatively connected to the controller for validating the laser 102 by laser pulse detection based on pulse duration and pulse repetition rate of laser spot 106 as viewed by the SWIR imaging sensor 110.

The imaging device 108 can include two imaging sensors, the SWIR imaging sensor 110 for imaging the laser spot 106 in a first channel and a second imaging sensor 120 for imaging the target 104 in a second channel. The second imaging sensor 120 can be sensitive in visible, thermal IR, or any other imaging band, but need not be sensitive to the predetermined wavelength, e.g. SWIR. The second imaging sensor 120 is optically coupled with an interchangeable optic 122 so that the focal length for imaging device 108 can be easily changed as needed.

Figure 2:
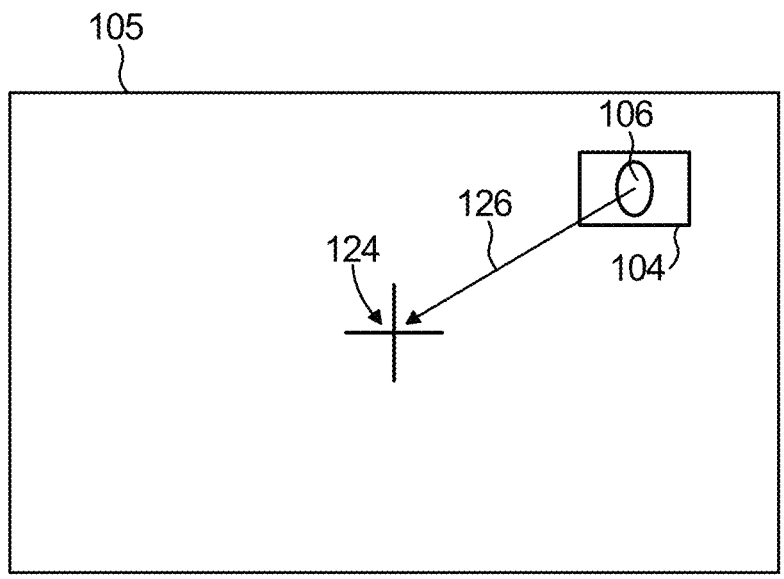
FIG. 2 is a schematic view of the field of view of the system of FIG. 1, showing how the laser spot is not centered in the field of view.

With reference now to FIG. 2, a method of digitally boresighting includes finding a laser spot, e.g. laser spot 106, in a field of view of an imaging device, e.g., imaging device 108, that has an optical center 124, wherein the laser spot is generated by a laser, e.g., laser 102. FIG. 1 shows the field of view 105 of the imaging device 108, where due to misalignment of the laser 102 and imaging device 108, the laser spot 106 is not at the optical center 124 of the field of view 105. The method includes determining an offset vector 126 between the laser spot 106 in the field of view and the optical center 124.

Figure 3:
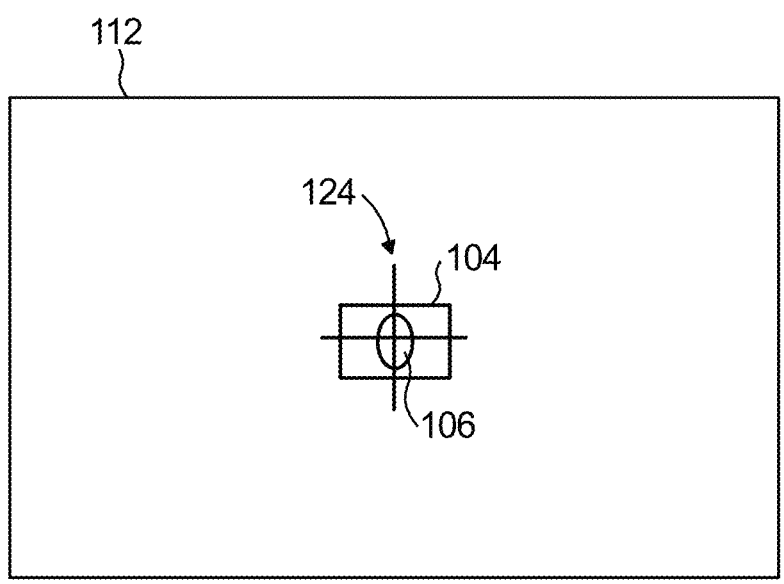
FIG. 3 is a schematic view of the corrected image displayed on the display of the system of FIG. 1, showing how the target and laser spot are centered on the output image.

With reference now to FIG. 3, the method includes correcting for boresight misalignment of the laser 102 and imaging device 108 in the image on a display 112. FIG. 3 shows the corrected image that is output on the display 112, wherein the laser spot 106 is centered to facilitate directing the laser 102 to the desired target 104 for range finding, even though the laser spot 106 may not be visible in the image on the display 110. Correcting for boresight misalignment can include offsetting the image displayed in the display 112, e.g., by cropping and/or scaling an image of the field of view 105 i.e., the image of FIG. 2, to center the laser spot 106 in the image displayed on the display 112 as shown in FIG. 3. It is also contemplated that in lieu of or in addition to cropping and scaling, correcting for boresight misalignment can include placing a cross-hair 126 over the laser spot 106 in the image displayed on the display 110.

In actual practice, some residual bore sight error will always exist in traditional laser range finders. Systems and methods as disclosed herein provide a mechanism in an imaging and range-finding system to maintain boresight alignment of a digital imaging channel to a laser range finder output such that the digital imaging channel can be reliably used to center the rangefinder laser source on a target and the laser rangefinder can be centered in the field of view of the digital imaging channel as output. Systems and method as disclosed herein can employ a camera that can see or detect the laser spot of a laser range finder and make digital adjustments to offset a displayed image of the target to center the displayed image or otherwise identify the laser spot in the displayed image to obviate boresight misalignment between the camera and the laser. Accurate targeting and range finding traditionally requires the laser source and direct view optics or camera to be boresighted with a very tight tolerance. This can be a time consuming calibration step during production and there is a risk of losing bore sight accuracy over time. Systems and methods as disclosed herein can loosen the manufacturing precision required, and can allow for use of interchangeable optics without requiring boresighting every time an optic is changed.

For systems that require laser spot detection and display, there is benefit to using a single optical path, e.g. with a SWIR focal plane array (FPA), for spot detection, imaging a scene, and laser marking location. By avoiding a secondary optical channel (e.g. a direct view or alternate camera) boresighted for laser marking location a second optical path and potential second entrance aperture is avoided, keeping system size small relative to if the direct view or alternate camera are included.

The methods and systems of the present disclosure, as described above and shown in the drawings, provide for boresighting laser range finders to imaging devices with superior properties including loosening tolerances for boresighting, allowing for interchangeable optics, and obviating the effects of deteriorating boresight alignment over time. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A laser range finder system comprising:
   a laser for illuminating a target with a laser spot in a predetermined wavelength;
   an imaging device connected to the laser for viewing the target, wherein the imaging device has a field of view with an optical center and is sensitive in the predetermined wavelength;
   a display operatively connected to the imaging device for displaying an image of the target; and
   a controller operatively connecting the imaging device to the display, wherein the controller includes machine readable instructions that cause the controller to:
   find the laser spot in the field of view of the imaging device;
   determine an offset vector between the laser spot in the field of view and the optical center; and
   correct for boresight misalignment of the laser and imaging device in the image on the display using the offset vector, wherein the controller is operatively connected to the imaging device and includes machine readable instructions that cause an imaging sensor of the imaging device to operate in a binary ON/OFF output first mode sensitive to short duration laser pulses for laser pulse detection, and to operate in a second mode for imaging scenic information for targeting context, wherein the imaging sensor operates with a higher dynamic range and lower frequency in the second mode than in the first mode, wherein the imaging sensor is a single focal plane array sensor that operates in both the first mode and in the second mode wherein the laser includes a pulse generator configured to illuminate the target with laser pulses, and wherein the imaging device includes an imaging sensor operatively connected to the controller for validating the laser by laser pulse detection based on pulse duration and pulse repetition rate, where the binary ON/OFF mode has a frequency fast enough to detect pulse repetition rate.

2. The system as recited in claim 1, wherein the machine readable instructions cause the controller to find the laser spot using the sensor in the first mode.

3. The system as recited in claim 1, wherein correcting for boresight misalignment includes offsetting the image displayed in the display.

4. The system as recited in claim 3, wherein offsetting the image displayed in the display includes at least one of cropping and/or scaling an image of the field of view of the imaging device to center the laser spot in the image displayed on the display.

5. The system as recited in claim 4, wherein the laser spot is not visible in the image displayed on the display.

6. The system as recited in claim 1, wherein correcting for boresight misalignment includes placing a cross-hair over the laser spot in the image displayed on the display.

7. The system as recited in claim 6, wherein the laser spot is not visible in the image displayed on the display.

8. The system as recited in claim 1, wherein the laser illuminates the target with a SWIR wavelength including 1550 nm, and wherein the imaging device includes a SWIR imaging sensor operatively connected to the controller for imaging the laser spot and determining the offset vector.

9. The system as recited in claim 1, wherein the imaging sensor is a first imaging sensor for imaging the laser spot in a first channel and wherein the imaging device further comprises a second imaging sensor for imaging the target in a second channel, wherein the first imaging sensor is sensitive to the predetermined wavelength, and wherein the second imaging sensor is not sensitive to the predetermined wavelength.

10. The system as recited in claim 9, wherein the second imaging sensor is optically coupled with an interchangeable optic.

11. A laser range finder system comprising:
an imaging device for viewing a target illuminated by a laser, wherein the imaging device has a field of view with an optical center and is sensitive in a predetermined wavelength; and
a controller operatively connected to the imaging device, wherein the controller includes machine readable instructions that cause the controller to:
find the laser spot in the field of view of the imaging device;
determine an offset vector between the laser spot in the field of view and the optical center; and
correct for boresight misalignment of the laser and imaging device in an image on a display using the offset vector, wherein the controller is operatively connected to the imaging device and includes machine readable instructions that cause an imaging sensor of the imaging device to operate in a binary ON/OFF output first mode sensitive to short duration laser pulses for laser pulse detection, and to operate in a second mode for imaging scenic information for targeting context, wherein the imaging sensor operates with a higher dynamic range and lower frequency in the second mode than in the first mode,
wherein the imaging sensor is a single focal plane array sensor that operates in both the first mode and in the second mode, wherein the laser includes a pulse generator configured to illuminate the target with laser pulses, and wherein the imaging device includes an imaging sensor operatively connected to the controller for validating the laser by laser pulse detection based on pulse duration and pulse repetition rate, where the binary ON/OFF mode has a frequency fast enough to detect pulse repetition rate.

12. A method of digitally boresighting comprising:
finding a laser spot in a field of view of an imaging device that has an optical center, wherein the laser spot is generated by a laser;
determining an offset vector between the laser spot in the field of view and the optical center; and
correcting for boresight misalignment of the laser and imaging device in the image on a display using the offset vector;
validating the laser by laser pulse detection based on pulse duration and pulse repetition rate; and
operating a first imaging sensor in a binary ON/OFF output first mode sensitive to short duration laser pulses for laser pulse detection, and operating the first imaging sensor in a second mode for imaging scenic information for targeting context, wherein the first imaging sensor operates with a higher dynamic range and lower frequency in the second mode than in the first mode,
wherein the imaging sensor is a single focal plane array sensor that operates in both the first mode and in the second mode, wherein the laser includes a pulse generator configured to illuminate the target with laser pulses, and wherein the imaging device includes an imaging sensor operatively connected to the controller for validating the laser by laser pulse detection based on pulse duration and pulse repetition rate, where the binary ON/OFF mode has a frequency fast enough to detect pulse repetition rate.

13. The method as recited in claim 12, wherein correcting for boresight misalignment includes offsetting the image displayed in the display.

14. The method as recited in claim 13, wherein offsetting the image displayed in the display includes at least one of cropping and/or scaling an image of the field of view of the imaging device to center the laser spot in the image displayed on the display.

15. The method as recited in claim 12, wherein correcting for boresight misalignment includes placing a cross-hair over the laser spot in the image displayed on the display.

16. The method as recited in claim 12, wherein the laser spot is not visible in the image displayed on the display.

* * * * *